A. Leonard,

Cultivator.

No. 106,702.   Patented Aug. 23, 1870.

Witnesses:
S. J. Noyes.
F. H. Pierson.

Inventor:
Aug. Leonard by
H. W. Beadle atty.

UNITED STATES PATENT OFFICE.

AUGUSTUS LEONARD, OF NEWELL'S RUN, OHIO.

IMPROVEMENT IN POTATO-PLOWS.

Specification forming part of Letters Patent No. 106,702, dated August 23, 1870.

*To all whom it may concern:*

Be it known that I, AUGUSTUS LEONARD, of Newell's Run, in the county of Washington and State of Ohio, have invented a new and useful Potato-Plow; and I do hereby declare that the following is a full and exact description of the same, reference being had to the accompanying drawings, and to the letters of reference marked thereon.

This invention has for its object the production of a plow, especially designed for use in the cultivation of potatoes, the shovels of which may be adjusted laterally by means of the handles; and it consists in certain details of construction, which will be fully described hereinafter.

Figure 1:
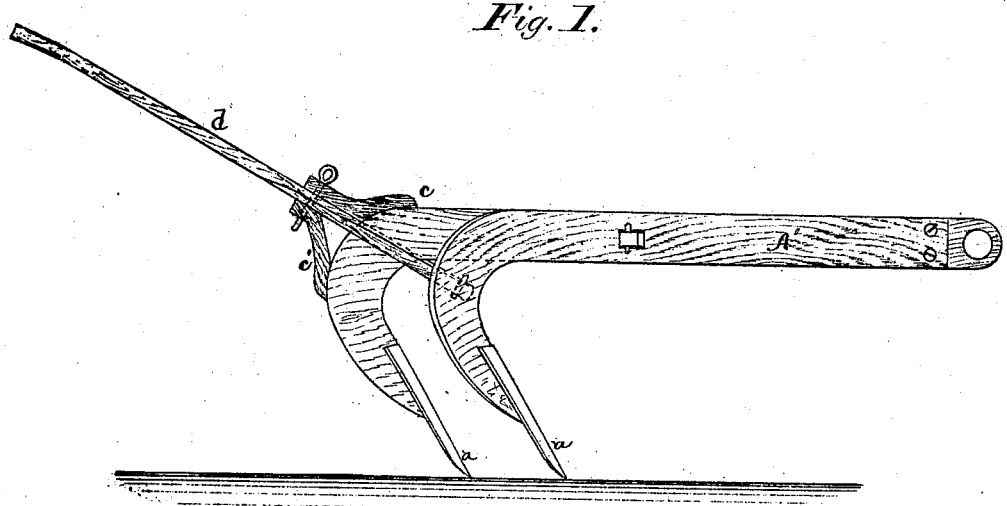
Figure 2:
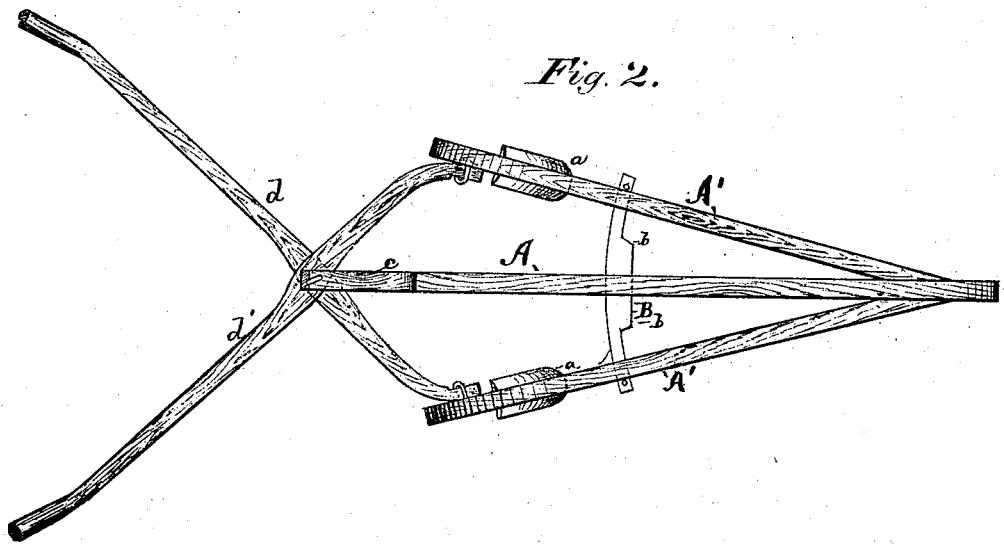

In the drawings, Figure 1 represents a side elevation of my improved plow, and Fig. 2 a plan view of the same.

To enable others skilled in the art to make and use my invention, I will now proceed to describe fully its construction and operation.

A represents the center beam, and A' A' the side beams, of my improved machine. These beams are rigidly united at their front ends, and are suitably curved and provided with shovels $a\ a\ a$ at their rear ends, as shown. The center beam, it will be observed, is longer than the side beams. They are constructed preferably of metal, having sufficient elasticity to permit the side beams to spring in toward the center beam when such action is necessary.

B represents a connecting-beam, which is rigidly attached to the center beam and extends on each side through a suitable orifice in the side beams, and is provided with a pin or stop at each end. It is provided also with shoulders $b\ b$, as shown, by means of which the inward lateral movement of the side beams is limited.

$c\ c'$ represent arms rigidly attached to the rear end of the center beam, as shown.

$d\ d'$ represent handles, which are secured to the arms $c\ c'$ by means of a bolt or pin, as shown. The front ends of the handles rest in staples attached to the inner sides of the side beams, A' A'.

The operation will be easily understood. The machine is used in the ordinary manner. The location of the center shovel in rear of the side shovels is important, inasmuch as the ridge formed by the latter is thrown down, and the ground is left nearly level.

The general construction is extremely simple and not liable to get out of order. The distance between the shovels is easily regulated by the handles.

I do not claim the constructing of a plow with shovels adjustable by means of the handles, for this I know is not new; but,

Having thus fully described my invention, what I claim as new, and desire to secure by Letters Patent, is—

The plow described, consisting of the beams A A' A', rigidly secured at the front ends, connecting-beam B, arms $c\ c'$, and handles $d\ d'$, when all the parts are constructed and arranged as described, for the purpose set forth.

This specification signed and witnessed this 16th day of April, 1870.

AUG. LEONARD.

Witnesses:
T. N. HIGGINS,
E. A. JONES.